(12) United States Patent
Yarbrough et al.

(10) Patent No.: US 10,760,545 B2
(45) Date of Patent: Sep. 1, 2020

(54) JOINT CONFIGURATION FOR A SEGMENTED WIND TURBINE ROTOR BLADE

(71) Applicant: General Electric Company, Schenectady, NY (US)

(72) Inventors: Aaron A. Yarbrough, Greenville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 467 days.

(21) Appl. No.: 15/426,324

(22) Filed: Feb. 7, 2017

(65) Prior Publication Data

US 2018/0223796 A1 Aug. 9, 2018

(51) Int. Cl.
*F03D 1/06* (2006.01)

(52) U.S. Cl.
CPC ...... *F03D 1/0675* (2013.01); *F05B 2240/221* (2013.01); *F05B 2240/301* (2013.01); *F05B 2240/302* (2013.01); *F05B 2260/30* (2013.01); *F05B 2260/502* (2013.01); *F05B 2280/6003* (2013.01); *Y02E 10/721* (2013.01)

(58) Field of Classification Search
CPC .............. F03D 1/0675; F05B 2240/221; F05B 2240/301; F05B 2240/302; F05B 2260/30; F05B 2260/502; F05B 2280/6003; F05B 2230/60; F05B 2230/23; Y02E 10/721
See application file for complete search history.

(56) References Cited

U.S. PATENT DOCUMENTS

| 7,922,454 | B1* | 4/2011 | Riddell | F03D 1/0675 416/224 |
| 9,388,789 | B2* | 7/2016 | Hibbard | F03D 1/0675 |
| 9,605,651 | B2* | 3/2017 | Busbey | F03D 1/0675 |
| 9,765,756 | B2* | 9/2017 | Hancock | F03D 1/0675 |
| 2012/0213642 | A1* | 8/2012 | Wang | F03D 1/0675 416/232 |
| 2014/0186189 | A1* | 7/2014 | Stege | B29D 99/0025 416/229 R |
| 2015/0240780 | A1* | 8/2015 | Leonard | F03D 1/0675 416/204 R |

* cited by examiner

*Primary Examiner* — Ninh H. Nguyen
*Assistant Examiner* — Eric J Zamora Alvarez
(74) *Attorney, Agent, or Firm* — Dority & Manning, P.A.

(57) ABSTRACT

A rotor blade assembly for a wind turbine may include a first blade segment having a first joint end and a second blade segment having a second joint end, with the blade segments being coupled together such that the first and second joint ends are located at or adjacent to a joint interface between the blade segments. The blade assembly may also include a pre-loaded beam extending outwardly from the second blade segment across the joint interface such that the pre-loaded beam is received within the first blade segment. The pre-loaded beam may be compressed between the opposed internal structural components of the first blade segment such that a first engagement interface is defined between a first side of the pre-loaded beam and the first internal structural component and a second engagement interface is defined between an opposed second side of the pre-loaded beam and the second internal structural component.

20 Claims, 11 Drawing Sheets

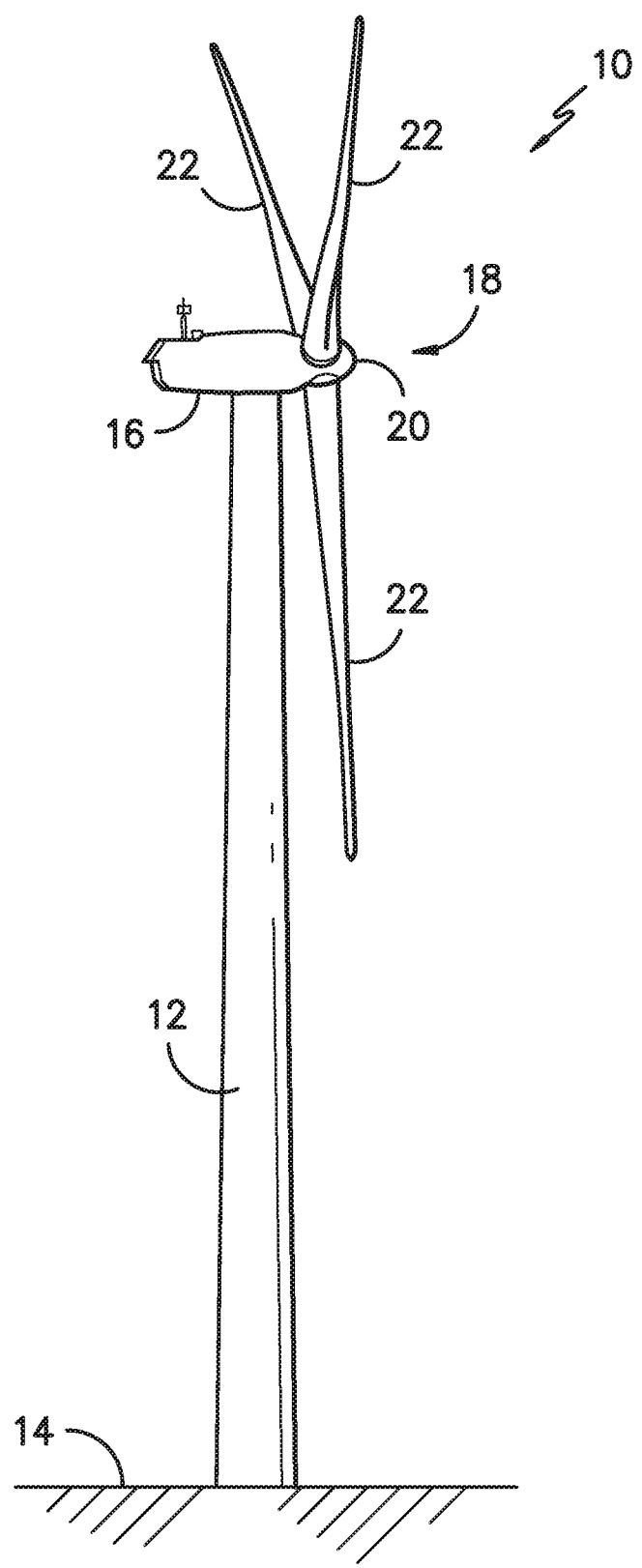
FIG. -1-

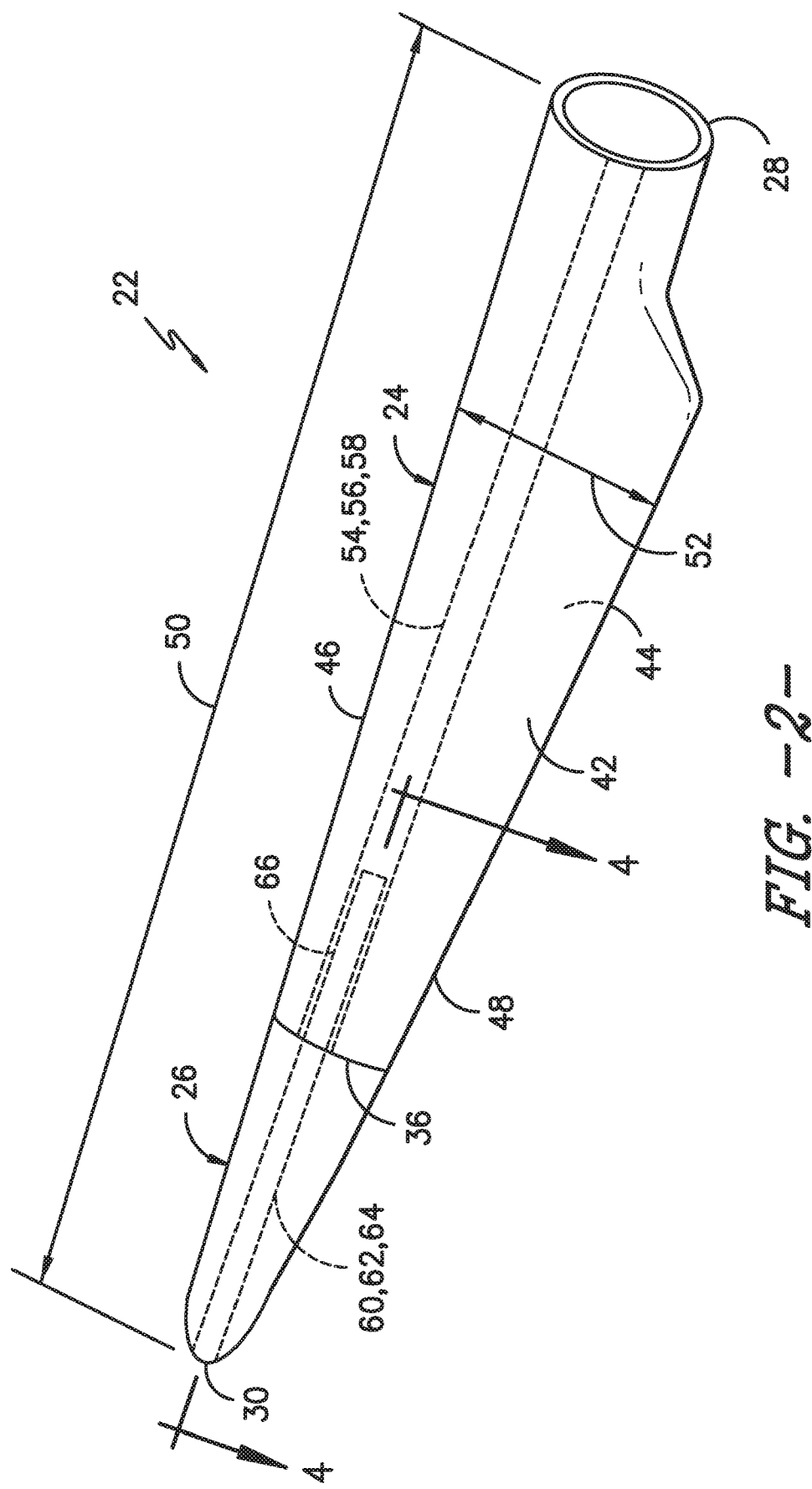
FIG. -2-

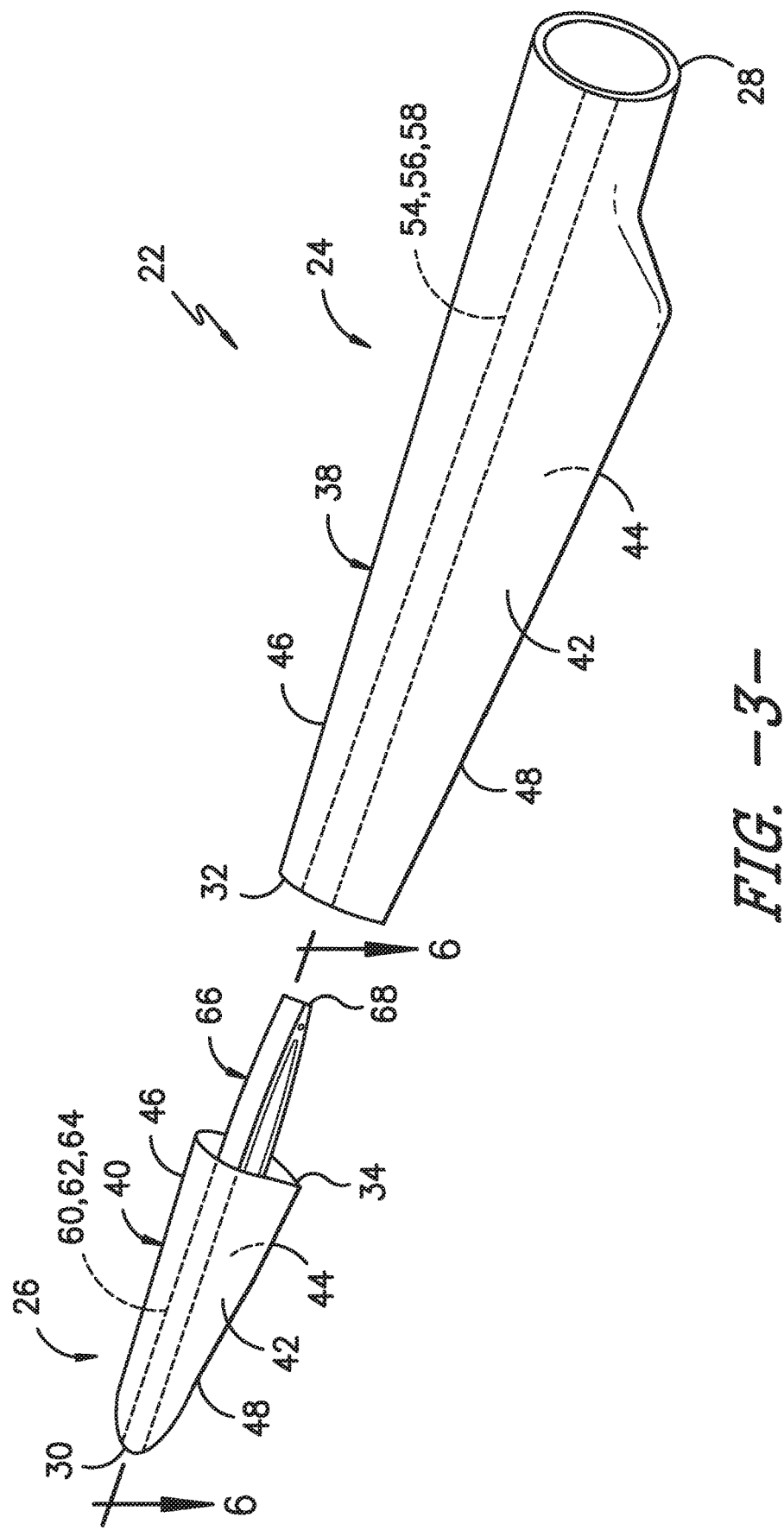

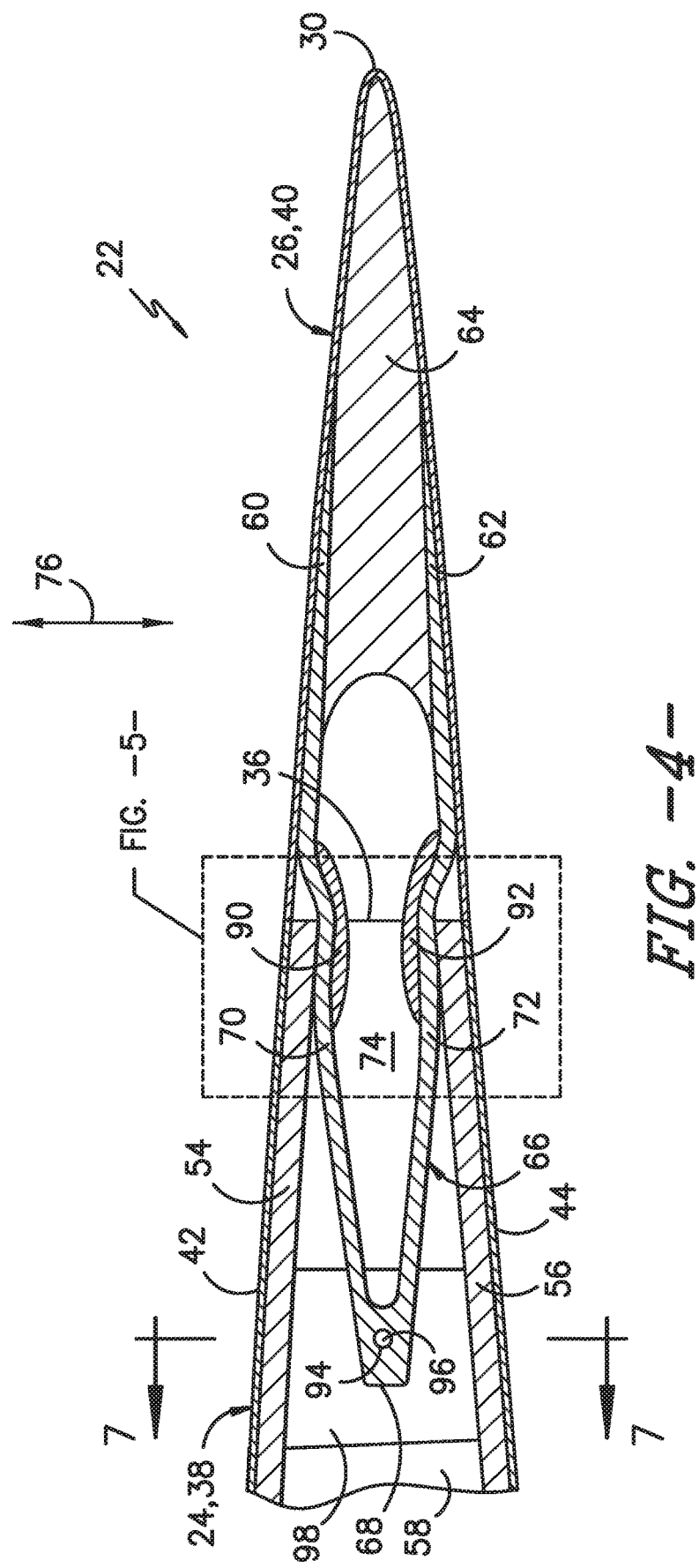

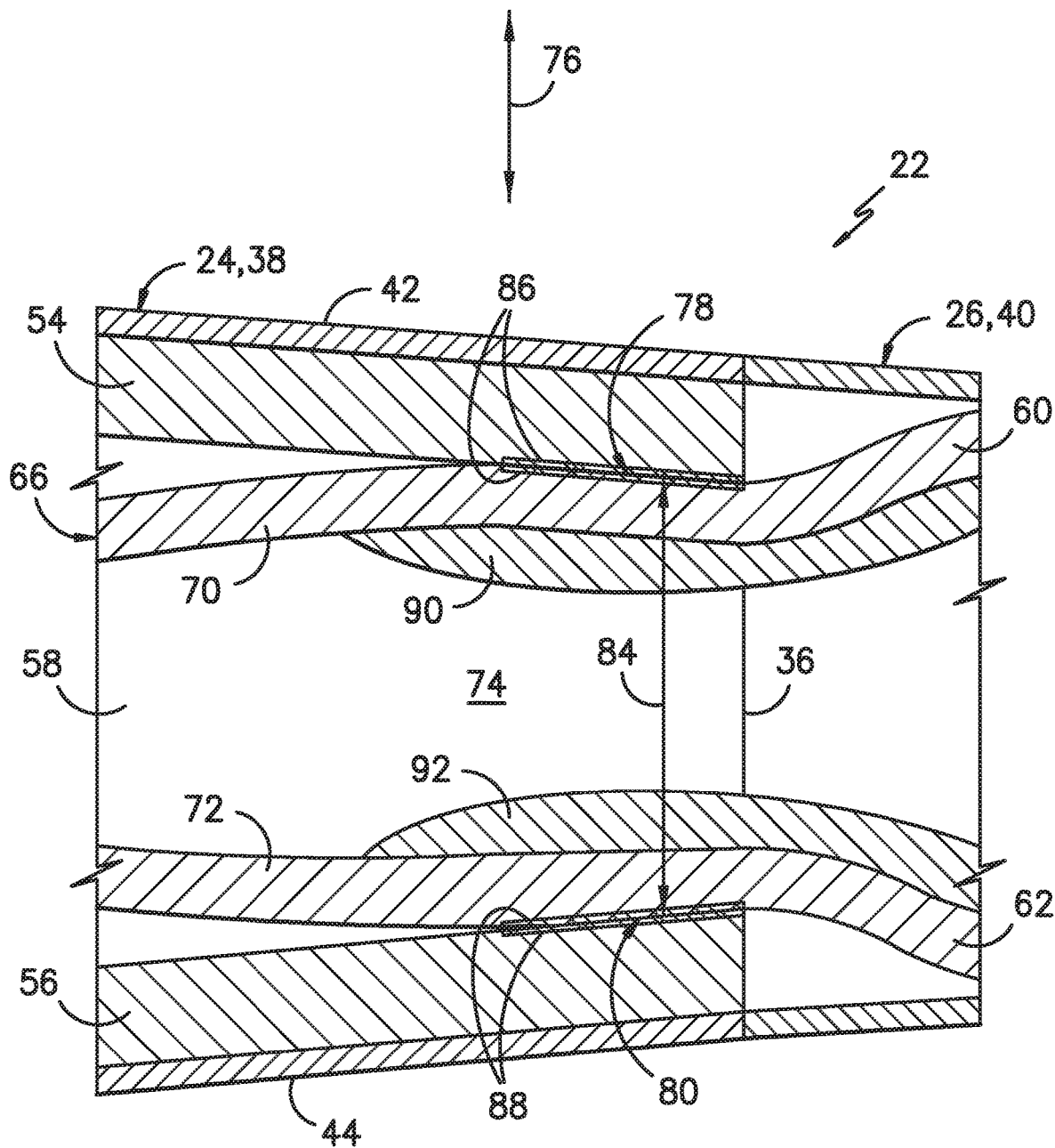
FIG. -5-

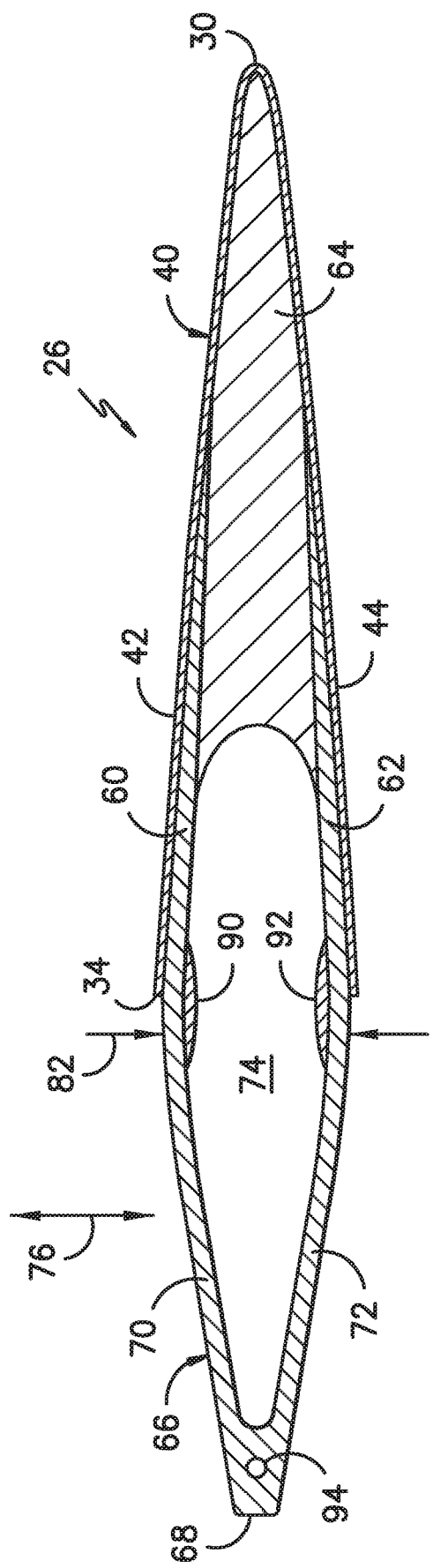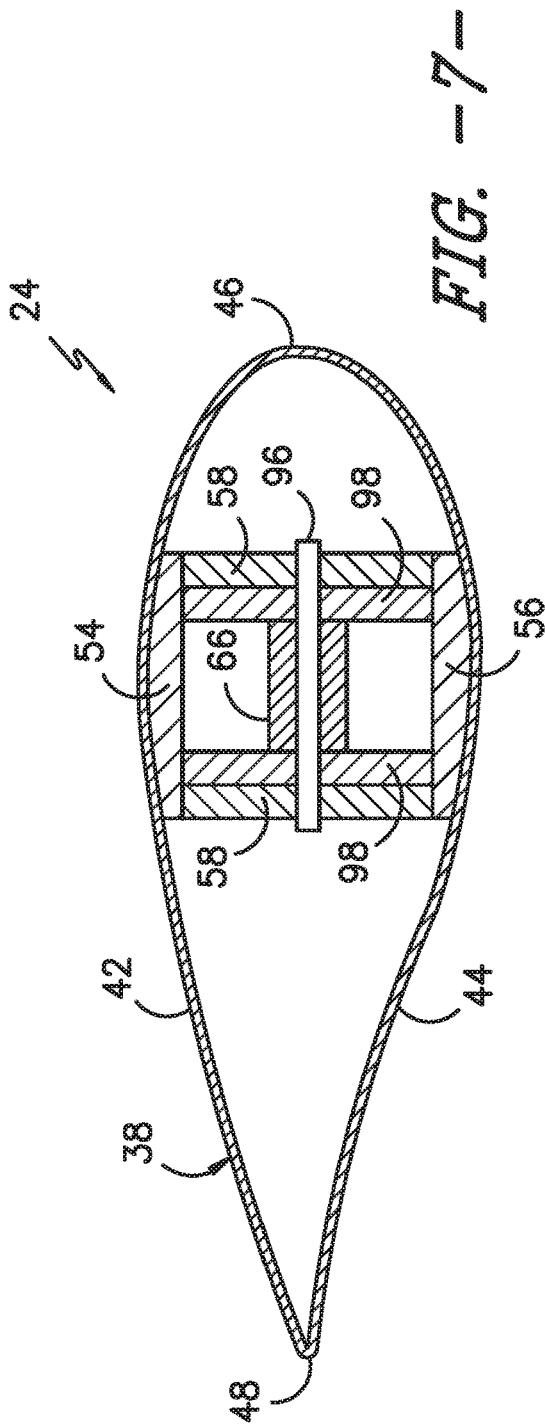

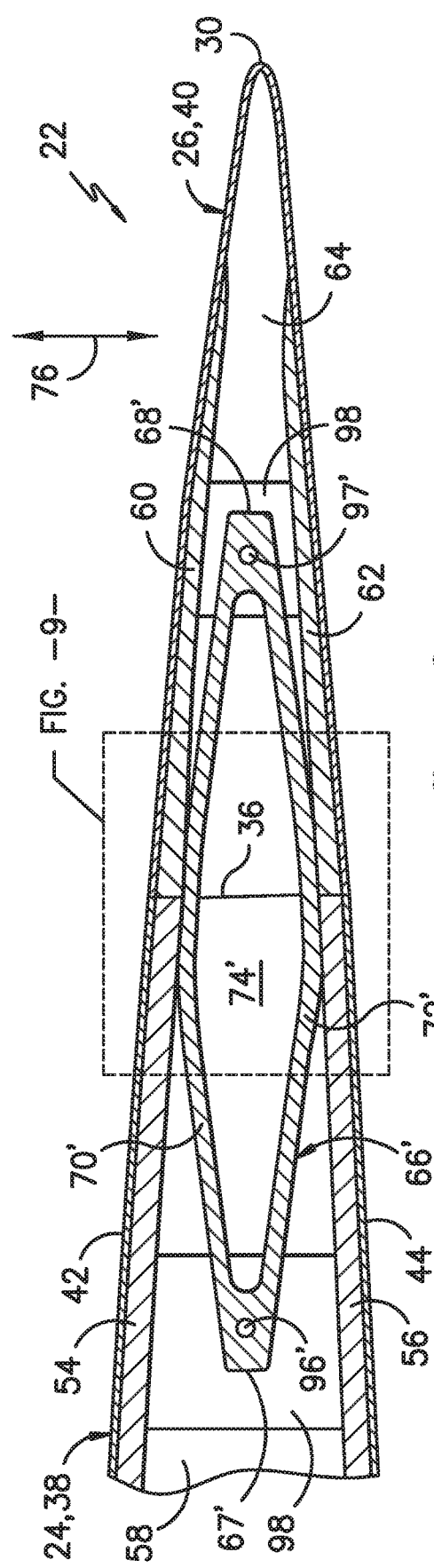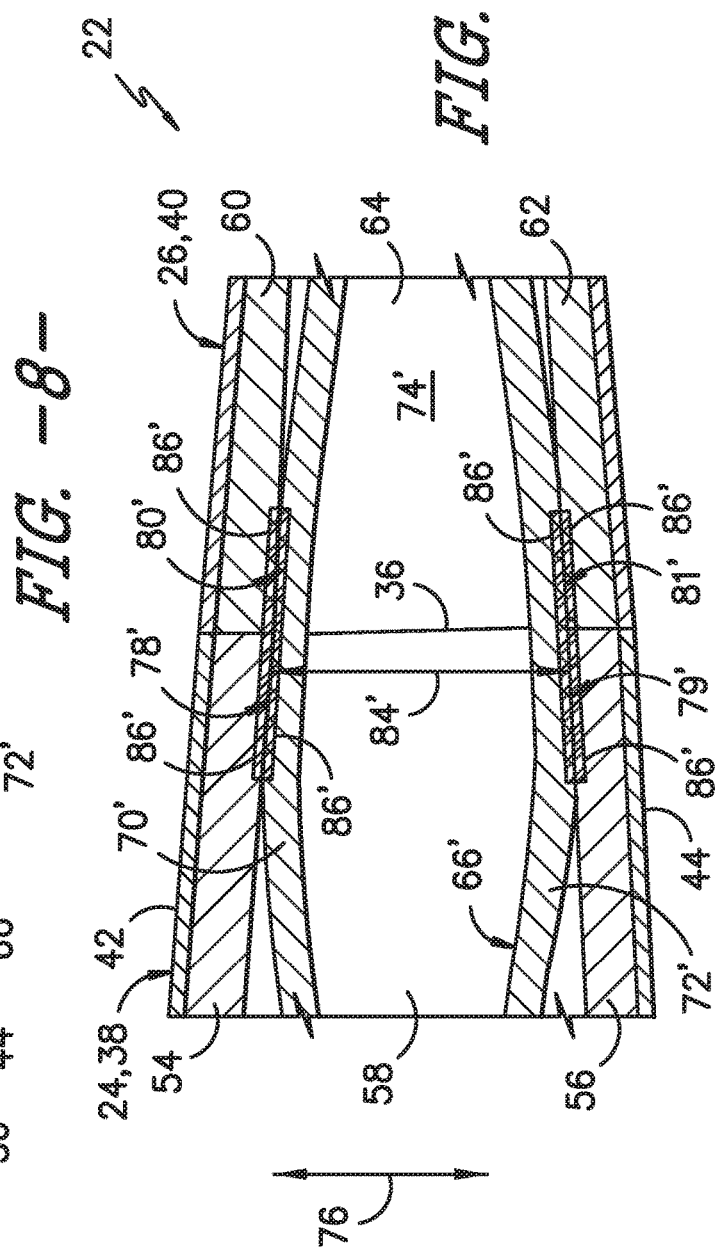

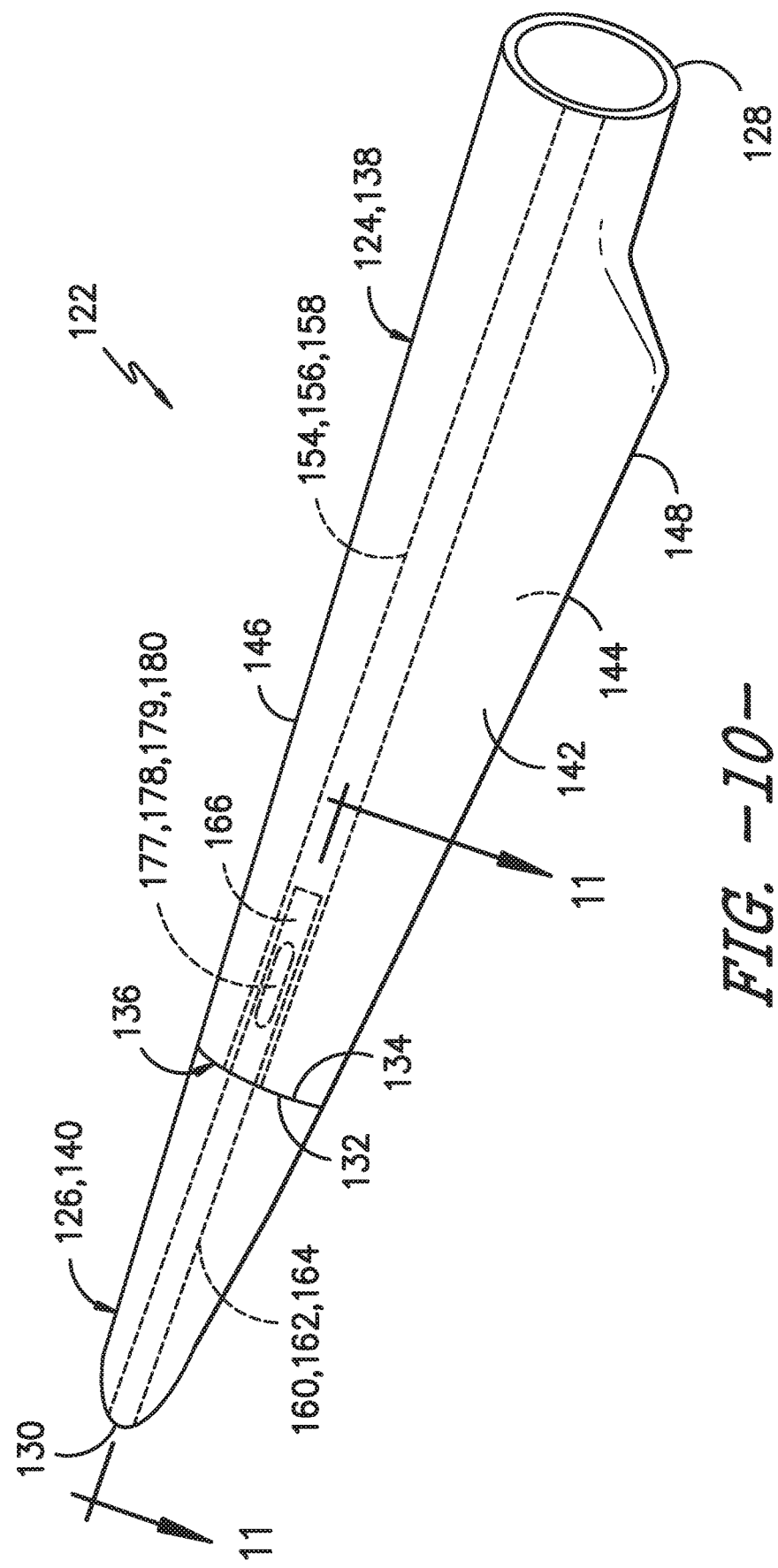
FIG. -10-

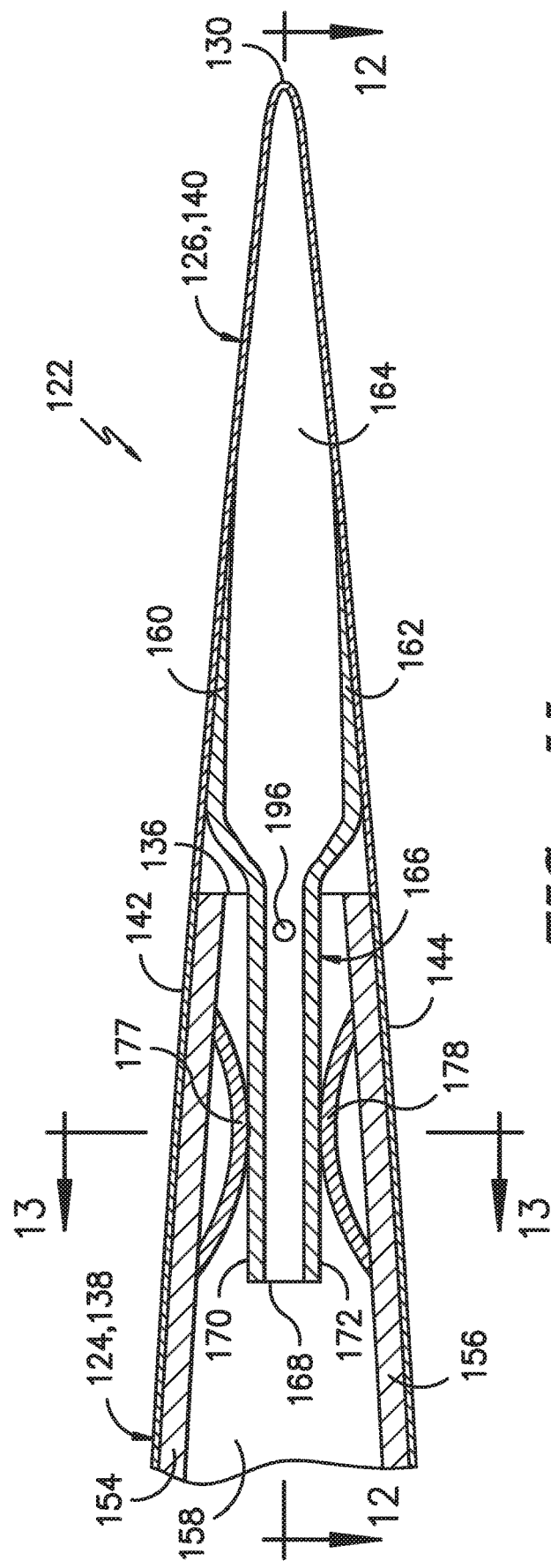
FIG. -11-

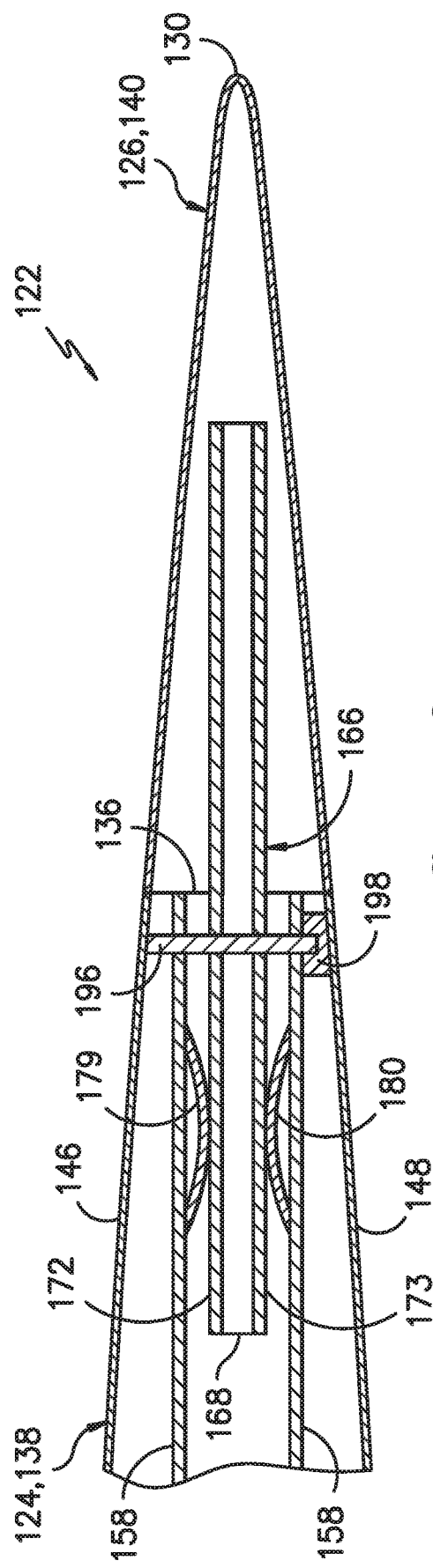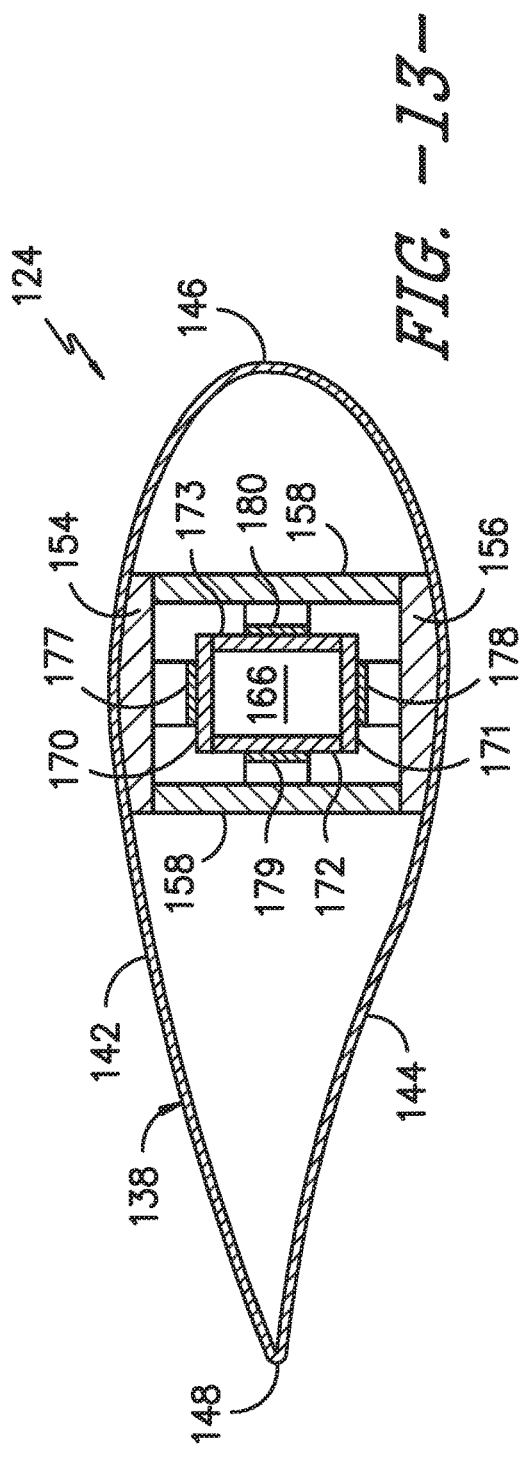

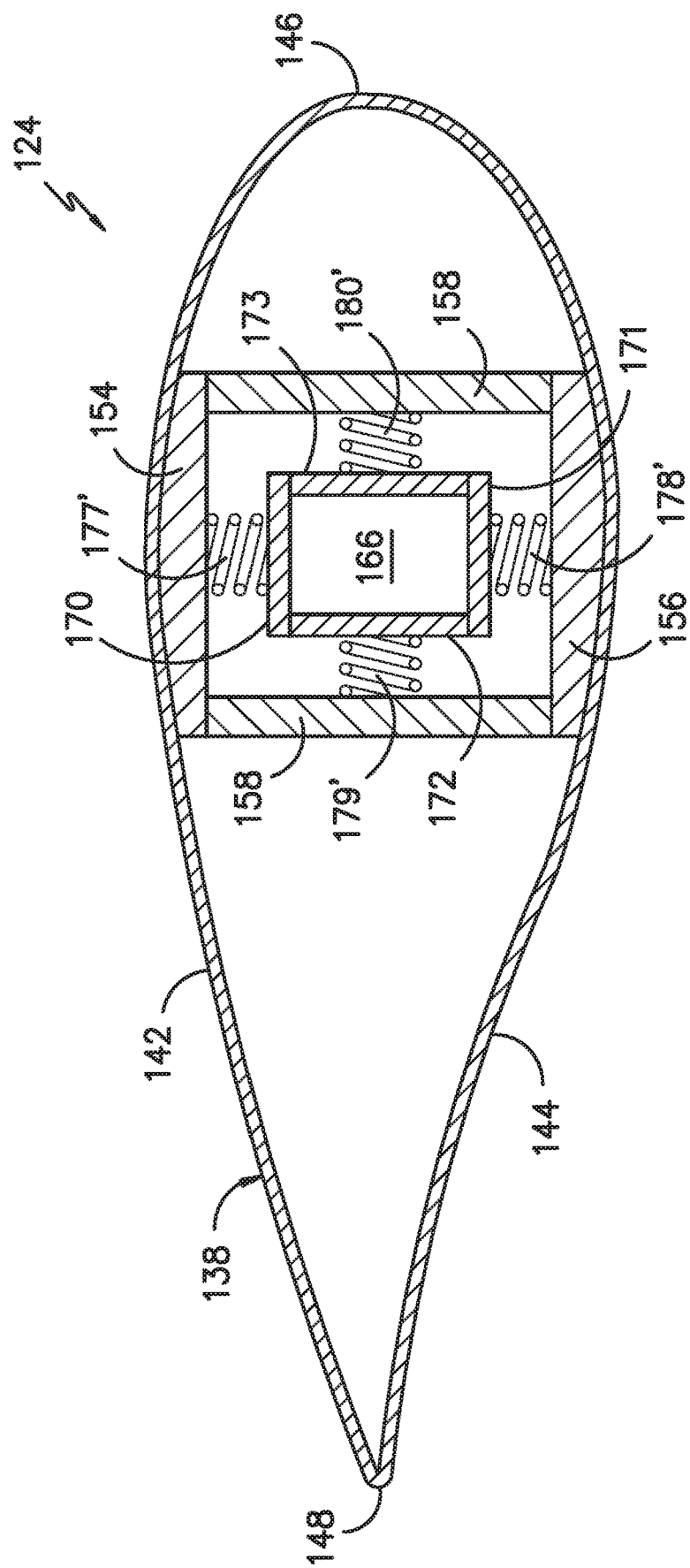
FIG. -14-

JOINT CONFIGURATION FOR A SEGMENTED WIND TURBINE ROTOR BLADE

FIELD

The present subject matter relates generally to rotor blades for wind turbines and, more particularly, to an improved joint configuration for a segmented wind turbine rotor blade that includes one or more pre-loaded joint members positioned at a contact or engagement interface defined between portions of the blade segments.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each rotor blade of a wind turbine typically includes a suction side shell and a pressure side shell formed using molding processes that are subsequently bonded together via adhesives at bond lines along the leading and trailing edges of the blade. The pressure and suction side shells are relatively lightweight and have structural properties (e.g., stiffness, buckling resistance and strength) that are not configured to withstand the bending moments and other loads exerted on the rotor blade during operation. Thus, to increase the stiffness, buckling resistance and strength of the rotor blade, the shells are typically reinforced using one or more structural components (e.g. opposed spar caps with a shear web configured therebetween) that engage the pressure and suction side inner surfaces of the shell halves. The spar caps are typically constructed of various materials, including but not limited to, fiber-reinforced laminate composites including a thermoset resin. The shells of the rotor blade are generally built around the spar caps by stacking layers of fiber fabrics in a shell mold. The layers are then typically infused together, e.g. with a thermoset resin.

In general, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade. However, known joint designs for connecting blade segments together typically have a variety of disadvantages. For example, many known joint designs utilize mechanical fasteners, such as bolts and nuts and/or pins, to secure blade segments together. However, the fasteners used in such bolted or pinned joint designs are typically quite heavy, thereby significantly increasing the overall weight of the rotor blade. Moreover, the mechanical fasteners are often metallic components, which can increase the likelihood of lightning strikes.

Accordingly, an improved joint configuration for joining adjacent blade segments of a segmented blade that addresses one or more of the issues described above would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly may include a first blade segment having a first joint end and a first pair of opposed internal structural components. The first pair of opposed internal structural components may include a first internal structural component and a second internal structural component. The rotor blade assembly may also include a second blade segment having a second joint end. The second blade segment may be coupled to the first blade segment such that the first and second joint ends are located at or adjacent to a joint interface defined between the first and second blade segments. In addition, the rotor blade assembly may include a pre-loaded beam extending outwardly from the second joint end of the second blade segment across the joint interface such that the pre-loaded beam is received within an interior of the first blade segment. The pre-loaded beam may be compressed between the first pair of opposed internal structural components of the first blade segment such that a first engagement interface is defined within the interior of the first blade segment between a first side of the pre-loaded beam and the first internal structural component and a second engagement interface is defined within the interior of the first blade segment between an opposed second side of the pre-loaded beam and the second internal structural component.

In another aspect, the present subject matter is directed to a rotor blade assembly for a wind turbine. The rotor blade assembly may include a first blade segment having a first joint end and a pair of opposed internal structural components extending within an interior of the first blade segment. The rotor blade assembly may also include a second blade segment having a second joint end, with the second blade segment being coupled to the first blade segment such that the first and second joint ends are located at or adjacent to a joint interface defined between the first and second blade segments. In addition, the rotor blade assembly may include a joint beam extending outwardly from the second joint end of the second blade segment across the joint interface such that the joint beam is received within an interior of the first blade segment at a location disposed between the opposed structural components of the first blade segment. Moreover, the rotor blade assembly may include a first pre-loaded compression member positioned between the joint beam and a first structural component of the opposed internal structural components of the first blade segment and a second pre-loaded compression member between the joint beam and a second structural component of the opposed internal structural components of the first blade segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective, assembled view of one embodiment of a rotor blade assembly in accordance with aspects of the present subject matter;

FIG. 3 illustrates a perspective, partially exploded view of the rotor blade assembly shown in FIG. 2;

FIG. 4 illustrates a cross-sectional view of the rotor blade assembly shown in FIG. 2 taken about line 4-4, particularly illustrating one embodiment of a suitable joint configuration for the rotor blade assembly in accordance with aspects of the present subject matter;

FIG. 5 illustrates an enlarged view of a portion of the rotor blade assembly shown in FIG. 4;

FIG. 6 illustrates a cross-sectional view of one of the blade segments of the rotor blade assembly shown in FIG. 3 taken about line 6-6;

FIG. 7 illustrates a cross-sectional view of the rotor blade assembly shown in FIG. 4 taken about line 7-7;

FIG. 8 illustrates a similar cross-sectional view of the rotor blade assembly as that shown in FIG. 4, particularly illustrating another embodiment of a suitable joint configuration for the rotor blade assembly in accordance with aspects of the present subject matter;

FIG. 9 illustrates an enlarged view of a portion of the rotor blade assembly shown in FIG. 8;

FIG. 10 illustrates a perspective, assembled view of another embodiment of a rotor blade assembly in accordance with aspects of the present subject matter;

FIG. 11 illustrates a cross-sectional view of the rotor blade assembly shown in FIG. 10 taken about line 11-11, particularly illustrating a further embodiment of a suitable joint configuration for the rotor blade assembly in accordance with aspects of the present subject matter;

FIG. 12 illustrates a cross-sectional view of the rotor blade assembly shown in FIG. 11 taken about line 12-12;

FIG. 13 illustrates a cross-sectional view of the rotor blade assembly shown in FIG. 11 taken about line 13-13; and FIG. 14 illustrates a similar cross-sectional view of the rotor blade assembly as that shown in FIG. 13, particularly illustrating yet another embodiment of a suitable joint configuration for the rotor blade assembly in accordance with aspects of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved joint configuration for a segmented rotor blade assembly. In several embodiments, the rotor blade assembly may include first and second blade segments configured to be coupled to each other at corresponding joint ends to form a blade joint or joint interface between the blade segments. Additionally, the rotor blade assembly may include one or more joint-related components for coupling the first blade segment to the second blade segment. Specifically, in several embodiments, the rotor blade assembly may include one or more pre-loaded joint members configured to be compressed or loaded at a contact or engagement interface defined between portions of the first and second blade segments when the blade segments are assembled together For instance, in one embodiment, a joint beam may be configured to extend outwardly from the joint end of one of the blade segments (e.g., the second blade segment) such that the joint beam is received within the other blade segment (e.g., the first blade segment) when the blade segments are assembled together. In accordance with aspects of the present subject matter, the joint beam may be configured to be compressed between opposed structural components of the first blade segment when received within the first blade segment such that the joint beam takes on a pre-loaded state or condition. For instance, in one embodiment, the joint beam may be configured to be compressed between opposed spar caps of the first blade segment such that a contact or engagement interface is defined between the joint beam and each spar cap. Due to the compression of the joint beam within the first blade segment, an interference-type or compression fit may be created between the joint beam and the spar caps as the joint beam applies an outwardly directed, reactive force against the opposed spar caps. The forced contact between the joint beam and the spar caps may provide an effective means for transferring loads between the blade segments.

In another embodiment, one or more pre-loaded compression members may be provided between the joint beam extending outwardly from the second blade segment and opposed structural components of the first blade segment. For instance, a first pair of pre-loaded compression members may be positioned between the joint beam and the opposed spar caps of the first blade segment while a second pair of pre-loaded compression members may be positioned between the joint beam and the opposed shear webs of the first blade segment. In such an embodiment, the pre-loaded compression members may be configured to be compressed between the joint beam and the opposed structural components of the first blade segment such that a contact or engagement interface is defined between the joint beam and each structural component via the associated pre-loaded compression member. Due to the compression of the pre-loaded compression members, an interference-type or compression fit may be created between the joint beam and the first blade segment, thereby providing an effective means for transferring loads between the blade segments.

In addition to allowing for effective load transfer between the blade segments, the disclosed pre-loaded joint member (s) (e.g., the pre-loaded joint beam and/or the pre-loaded compression member(s)) may also provide various other advantages. For example, by forming the pre-loaded joint member(s) from a composite material, such as a fiber-reinforced composite, a significant amount of metallic hardware may be removed from the rotor blade assembly, thereby reducing the potential for lightning strikes. Additionally, given the compression fit provided via the pre-loaded joint member(s), such member(s) may assist in aligning the blade segments with each other when assembling the disclosed rotor blade assembly. Moreover, due to the spring-like qualities of the pre-loaded joint member(s), the pre-loaded joint members may provide an elastic support interface that allows for some flexibility or relative movement between the blade segments. Furthermore, the pre-loaded compression members may provide for increased surface or contact area at the engagement interfaces defined between the blade segments, thereby spreading out the loads across a larger area.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade assembly 22 coupled to and extending outwardly from the hub 20. For example, in the illustrated embodiment, the rotor 18 includes three rotor blade assemblies 22. However, in an alternative embodiment, the rotor 18 may include more or less than three rotor blade assemblies 22. Each rotor blade assembly 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2 and 3, one embodiment of a segmented rotor blade assembly 22 suitable for use with the wind turbine 10 shown in FIG. 1 is illustrated in accordance with aspects of the present subject matter. Specifically, FIG. 2 illustrates a perspective, assembled view of the rotor blade assembly 22 and FIG. 3 illustrates a perspective, partially exploded view of the rotor blade assembly 22.

As shown, the rotor blade assembly 22 may generally be formed from a plurality of spanwise blade segments 24, 26 configured to be coupled end-to-end such that the rotor blade assembly 22 extends between a blade root 28 configured to be mounted or otherwise secured to the hub 20 (FIG. 1) of the wind turbine 10 and a blade tip 30 disposed opposite the blade root 28. For example, in the illustrated embodiment, the rotor blade assembly 22 is formed from two blade segments 24, 26, namely a first blade segment 24 (e.g., a root segment) and a second blade segment 26 (e.g., a tip segment). As particularly shown in FIG. 3, the first blade segment 24 may generally extend lengthwise between the blade root 28 and a first joint end 32. Similarly, the second blade segment 26 may generally extend lengthwise between the blade tip 30 and a second joint end 34. In such an embodiment, the first and second blade segments 24, 26 may generally be configured to be coupled to one another at their joint ends 32, 34. For example, as shown in FIG. 2, when the blade segments 24, 26 are coupled together at their joint ends 32, 34, a joint interface 36 may be defined between the two segments 24, 26 at the location of the blade joint.

It should be appreciated that, in other embodiments, the rotor blade assembly 22 may be formed from any other suitable number of spanwise blade segments. For instance, the rotor blade assembly 22 may be formed from three blade segments or more than three blade segments, such as four blade segments, five blade segments, or more than five blade segments.

In general, each blade segment 24, 26 may include an outer shell 38, 40 configured to extend between the opposed ends of such segment that generally serves as the outer casing/covering of the blade segment 24, 26. For instance, the first blade segment 24 may include a first outer shell 38 (FIG. 3) extending lengthwise between the blade root 28 and the first joint end 32. Similarly, the second blade segment 26 may include a second outer shell 40 (FIG. 3) extending lengthwise between the second joint end 34 and the blade tip 30. Each of the outer shells 38, 40 may generally be configured to define spanwise portions of the aerodynamic profile of the rotor blade 22. As such, the outer shells 38, 40 may collectively define a pressure side 42 and a suction side 44 of the rotor blade assembly 22, with the pressure and suction sides 42, 44 extending between leading and trailing edges 46, 48 of the rotor blade assembly 22.

As shown in FIG. 2, when assembled, the rotor blade assembly 22 may also have a span 50 defining the total length between the blade root 28 and the blade tip 30. In addition, the rotor blade assembly 22 may define a chord 52 corresponding to the total length of the blade between its leading and trailing edges 46, 48. As is generally understood, the chord 52 may generally vary in length with respect to the span 50 as the rotor blade assembly 22 extends from the blade root 28 to the blade tip 30.

It should be appreciated that, in several embodiments, the outer shells 38, 40 of the blade segments 24, 26 may be formed from one or more shell components. For instance, in one embodiment, each outer shell 38, 40 may be formed form a pressure side shell (not shown) forming a portion of the pressure side 42 of the rotor blade assembly 22 and a suction side shell (not shown) forming a portion of the suction side 44 of the rotor blade assembly 22. In addition, the outer shells 28, 30 may generally be formed from any suitable material. For instance, in several embodiments, each outer shell 38, 40 may be formed from a fiber-reinforced composite, such as a fiber reinforced laminate including a plurality of fibers (e.g., glass or carbon fibers) surrounded by a suitable matrix material (e.g., a thermoset resin material or a thermoplastic resin material). In addition, one or more portions of each outer shell 38, 40 may be configured as a layered construction and may include a core material, formed from a lightweight material such as wood (e.g., balsa), foam (e.g., extruded polystyrene foam) or a combination of such materials, disposed between layers of laminate composite material.

Additionally, in several embodiments, each blade segment 24, 26 may also include one or more internal structural components configured to provide increased stiffness, buckling resistance and/or strength to the rotor blade assembly 22. For example, as shown in dashed lines in FIGS. 2 and 3, the first blade segment 24 may include one or more pairs of longitudinally extending structural components positioned within the first outer shell 38, such as a pair of opposed spar caps 54, 56 (e.g., a first pressure side spar cap 54 (FIGS. 4, 5, and 7) and a first suction side par cap 56 (FIGS. 4, 5, and 7)) and one or more shear webs 58 extending between the opposed spar caps 54, 56. Similarly, as shown in dashed lines in FIGS. 2 and 3, the second blade segment 26 may include one or more one or more longitudinally extending structural components positioned within the second outer shell 40, such as a pair of opposed spar caps 60, 62 (e.g., a second pressure side spar cap 60 (FIGS. 4-6) and a second suction side par cap 62 (FIGS. 4-6)) and one or more shear webs 64 extending between the opposed spar caps 60, 62.

Additionally, one or more joint-related components of the rotor blade assembly 22 may be configured to extend across the joint interface 36 defined between the blade segments 24, 26 to facilitate coupling the first blade segment 24 to the second blade segment 26. For instance, as shown in the illustrated embodiment, the second blade segment 26 may include a joint beam 66 extending outwardly from its second joint end 34 that is configured to be received within the interior of the first blade segment 24. As will be described in greater detail below, when the joint beam 66 is initially inserted within the first blade segment 24, the joint beam 66 may, in one embodiment, be compressed between the opposed spar caps 54, 56 of the first blade segment 24 so as to take on a pre-loaded state or condition. Such compression of the joint beam 66 between the spar caps 54, 56 of the first blade segment 34 may create an interference-type or compression fit between the joint beam 66 and the first blade segment 24 at the contact or engagement interfaces defined between the joint beam 66 and the opposed inner surfaces of the spar caps 54, 56. As a result of such forced contact, loads from the second blade segment 26 may be transferred to the first blade segment 36 via the contact provided at the compression fit defined between the joint beam 66 and the opposed spar caps 54, 56 of the first blade segment 24.

It should be appreciated that, as used herein, the term "pre-loaded" refers to the compressed or loaded state or condition of a component when the disclosed rotor blade assembly 22 is assembled together without any additional operational or other external forces acting on the rotor blade assembly 22. For instance, as indicated above, the joint beam 66 may be pre-loaded when installed within the first blade segment 24 due to the compressive loading applied on the joint beam 66 by the opposed spar caps 54, 56 of the first blade segment 24.

Referring now to FIGS. 4-7, one embodiment of a suitable joint configuration for the rotor blade assembly 22 shown in FIGS. 2 and 3 is illustrated in accordance with aspects of the present subject matter. Specifically, FIG. 4 illustrates a cross-sectional view of the rotor blade assembly 22 shown in FIG. 2 taken about line 4-4 and FIG. 5 illustrates an enlarged view of a portion of the rotor blade assembly 22 shown in FIG. 4. FIG. 6 illustrates a cross-sectional view of the second blade segment 26 shown in FIG. 3 taken about line 6-6. Additionally, FIG. 7 illustrates a cross-sectional view of the rotor blade assembly 22 shown in FIG. 4 taken about line 7-7.

In general, the joint beam 66 of the second blade segment 26 may correspond to a structural-type, hollow beam configured to extend outwardly from the second joint end 34 of the second blade segment 24 to an outer beam end 68. As particularly shown in FIG. 6, the joint beam 66 may include a first beam portion 70 extending between the second joint end 34 of the second blade segment 26 and the outer beam end 68 that generally forms a first side of the joint beam 66 (e.g., the side extending adjacent to pressure side 42 of the rotor blade assembly 22). Similarly, the joint beam 66 may include a second beam portion 72 extending between the second joint end 34 of the second blade segment 26 and the outer beam end 68 that generally forms a second side of the joint beam 66 (e.g., the side extending adjacent to suction side 44 of the rotor blade assembly 22).

Additionally, the first and second beam portions 70, 72 may be configured to be spaced apart from one another such that a gap 74 is defined between the beam portions 70, 72 in a flapwise direction of the rotor blade assembly 22 (e.g., as indicated by arrow 76). As shown in FIG. 6, the size of the gap 74 defined between the beam portions 70, 72 may be reduced as the joint beam 66 extends outwardly from the second joint end 34 of the second blade segment 26, with the first and second beam portions 70, 72 merging together or otherwise being coupled to each other at or adjacent to the outer beam end 68 of the joint beam 66. Moreover, in one embodiment, the flapwise gap 74 defined between the first and second beam portions 70, 72 may also extend inwardly from the second joint end 34 of the second blade segment 26 such that the gap 74 is also defined between the opposed spar caps 60, 62 of the second blade segment 24. For instance, as shown in FIG. 6, the flapwise gap 74 may extend inwardly to the location of the shear web 64 positioned between the opposed spar caps 60, 63 of the second blade segment 26.

In one embodiment, the joint beam 66 may be formed integrally with the opposed spar caps 60, 62 of the second blade segment 24. For example, as shown in FIG. 6, the first beam portion 70 of the joint beam 66 may correspond to an extension of the pressure side spar cap 60 of the second blade segment 26 while the second beam portion 72 of the joint beam 66 may correspond to an extension of the suction side spar cap 62 of the second blade segment 26. In such an embodiment, the joint beam 66 may be formed from the same material as the spar caps 60, 62 of the second blade segment 26, such as a fiber-reinforced composite material. However, in alternative embodiments, the first and second beam portions 70, 72 of the joint beam 66 may correspond to separate components configured to be separately coupled to the second blade segment 24. For instance, as will be described below, the joint beam may be correspond to a separate component configured to be installed within the interior of both the first blade segment 24 and the second blade segment 26. In such an embodiment, the joint beam 66 may be formed from a composite material (e.g., a fiber-reinforced composite) or any other suitable material that allows the joint beam to function as described herein.

Given the configuration of the joint beam 66 shown in the illustrated embodiment, the first and second beam portions 70, 72 of the joint beam 66 may be configured to be compressed towards each other when the joint beam 66 is received within the interior of the first blade segment 26, thereby creating a "pre-loaded" beam within the first blade segment 26 and allowing the beam portions 70, 72 to serve as spring-like members providing an outwardly directed, reactive force against the adjacent, contacting portions of the first blade segment 24. Such compression of the beam portions 70, 72 upon installation of the joint beam 66 within the first blade segment 24 may create an interference-type or compression fit between the joint beam 66 and the adjacent, contacting portions of the first blade segment 24. For instance, as shown in FIG. 4, when the joint beam 66 is installed within the first blade segment 24, the joint beam 66 may be compressed between the opposed spar caps 54, 56 of the first blade segment 34. As a result, a contact or engagement interface 78, 80 may be defined between the joint beam 66 and each spar cap 54, 56 of the first blade segment 24. For instance, as particularly shown in FIG. 5, a first engagement interface 78 may be defined between the first beam portion 70 of the joint beam 66 and the pressure side spar cap 54 of the first blade segment 24 while a second engagement interface 80 may be defined between the second beam portion 72 of the joint beam 66 and the suction side spar cap 56 of the first blade segment 24.

It should be appreciated that, given the compression of the joint beam 66 between the opposed spar caps 54, 56 of the first blade segment 24, the flapwise height of the joint beam 66 may be reduced when the first and second blade segments 24, 26 are assembled together. For instance, as shown in FIG. 6, the joint beam 66 may define a non-compressed or unloaded flapwise height 82 between the outer surfaces of the first and second beam portions 70, 72 (e.g., at a spanwise location at or adjacent to the second joint end 34 of the second blade segment 26) prior to the joint beam 66 being installed within the first blade segment 24. However, when the joint beam 66 is installed within the interior of the first blade segment 24, the beam portions 70, 72 may be compressed towards each other such that the joint beam 66 defines a compressed or pre-loaded flapwise height 84 between the outer surfaces of the first and second beam portions 70, 72 at the same spanwise location of the joint beam 66, with the pre-loaded flapwise height 84 being less than the non-compressed or unloaded flapwise height 82.

Additionally, in one embodiment, one or more wear-resistant components and/or coatings may be provided at each engagement interface 78, 80 defined between the joint beam 66 and the first blade segment 24. For instance, as shown in FIG. 5, a first pair of wear plates 86 may be provided at the engagement interface 78 defined between the first beam portion 70 of the joint beam 66 and the pressure side spar cap 54 of the first blade segment 24 while a second pair of wear plates 88 may be provided at the engagement interface 80 defined between the second beam portion 72 of the joint beam 66 and the suction side spar cap 56 of the first blade segment 24. Alternatively, any other suitable wear resistant component(s) and/or coating(s) may be provided at each engagement interface 78, 80 to provide a more durable surface to accommodate the rubbing and/or loading occurring at such interfaces.

Moreover, in one embodiment, one or more stiffening members may be provided within the gap 74 defined between the first and second beam portions 70, 72 of the joint beam 66 to provide additional structural integrity to the joint beam 66, particularly during compression of the joint beam 66. For instance, as shown in FIGS. 4 and 6, first and second stiffening members 90, 92 may be provided along the inner surfaces of the first and second beam portions 70, 72, respectively, at or adjacent to the spanwise location(s) of the engagement interfaces 78, 80 defined between the joint beam 66 and the first blade segment 24. In one embodiment, the stiffening members 90, 92 may correspond to separate, pre-formed components configured to be separately coupled to the inner surfaces of the beam portions 70, 72. Alternatively, the stiffening members 90, 92 may be formed using a wet lay-up process along the inner surfaces of the beam portions 70, 72.

Referring still to FIGS. 4-7, in several embodiments, the joint beam 66 may be configured to be coupled to the first blade segment 24 via a pinned connection at or adjacent to its outer beam end 68. Specifically, in the illustrated embodiment, the joint beam 66 may define an opening 94 at or adjacent to its outer beam end 68 that is configured to receive a retaining pin 96 for coupling the joint beam 66 to the first blade segment 24. As particularly shown in FIG. 7, the retaining pin 96 may be configured to be received through one or more structural members or components extending between the opposed spar caps 54, 56 of the first blade segment 24, such as one or more of the shear webs 58 and/or one or more associated bearing blocks 98 installed at or adjacent to the shear webs 58. Such a pinned connection may function to prevent outward axial or spanwise movement of the second blade segment 26 relative to the first blade segment 24 during operation of the wind turbine 10. In this regard, the pinned connection may prevent axial liberation of the second blade segment 26 from the first blade segment 24 while the interference or compression fit provided at the contact or engagement interfaces 78, 80 defined between the joint beam 66 and the opposed spar caps 54, 56 of the first blade segment 24 may serve to allow loads to be transferred from the second blade segment 26 to the first blade segment 24.

It should be appreciated that, although the joint beam 66 is described herein as extending outwardly from the second blade segment 26, the joint beam 66 may, instead, be configured to extend outwardly from the first blade segment 24. In such an embodiment, the joint beam 66 may be configured to be received within the interior of the second blade segment 26 and compressed between the opposed spar caps 60, 62 of the second blade segment 26.

Referring now to FIGS. 8 and 9, another embodiment of a joint beam 66' suitable for use within the rotor blade assembly 22 described above with reference to FIGS. 2 and 3 is illustrated in accordance with aspects of the present subject matter. Specifically, FIG. 8 illustrates a similar cross-sectional view of the rotor blade assembly 22 shown in FIG. 4, particularly illustrating a cross-sectional view of the alternative embodiment of the joint beam 66' installed within the first and second blade segments 24, 26. Additionally, FIG. 9 illustrates an enlarged view of a portion of the rotor blade assembly 22 shown in FIG. 8.

As shown in the illustrated embodiment, unlike the embodiment described above in which the joint beam 66 is formed integrally with the spar caps 60, 62 of the second blade segment 26, the joint beam 66' corresponds to a separate structural component configured to be installed across the joint interface 36 defined between the first and second blade segments 24, 26. Specifically, as shown in FIG. 8, the joint beam 66' may be configured to extend lengthwise or spanwise between a first outer beam end 67' positioned within the interior of the first blade segment 24 and a second outer beam end 68' positioned within the interior of the second blade segment 26. Additionally, the joint beam 66' may include a first beam portion 70' extending between the first and second outer beam ends 68',69' that generally defines the first side of the joint beam 66' and a second beam portion 72' extending between the first and second outer beam ends 68',69' that generally defines the second side of the joint beam 66'. Similar to the embodiment of the joint beam 66 described above, the first and second beam portions 70',72' may be configured to be spaced apart from one another such that a flapwise gap 74' is defined between the beam portions 70, 72 in the flapwise direction 76 of the rotor blade assembly 22, with the size of the gap 74' tapering downwardly as the joint beam 66' extends towards each of its outer beam ends 68',69'. Specifically, as shown in FIG. 8, the gap 74' may be tapered down as the first and second beam portions 70',72' merge together or are otherwise coupled to each other at or adjacent to the opposed outer beam ends 68',69' of the joint beam 66'.

Given the configuration of the joint beam 66' shown in the illustrated embodiment, the first and second beam portions 70',72' of the joint beam 66' may be configured to be compressed towards each other when the joint beam 66' is installed within the first and second blade segments 24, 26, thereby creating a "pre-loaded" beam across the joint interface 36 defined between the blade segments 24, 26 and allowing the beam portions 70', 72' to serve as spring-like members providing an outwardly directed, reactive force against the adjacent, contacting portions of the first and second blade segments 24, 26. Similar to the embodiment described above, such compression of the beam portions 70', 72' upon installation of the joint beam 66' may create an interference-type or compression fit between the joint beam 66' and the adjacent, contacting portions of the blade segments 24, 26. For instance, as shown in FIG. 9, when the joint beam 66' is installed within the blade segments 24, 26, the joint beam 66' may be compressed between the opposed spar caps 54, 56, 60, 62 of both the first blade segment 24 and the second blade segment 26. As a result, a contact or engagement interface may be defined between the joint beam 66 and each spar cap 54, 56, 60, 62 at a location generally adjacent to the joint interface 36. For instance, as particularly shown in FIG. 9, a first engagement interface 78' may be defined between the first beam portion 70' of the joint beam 66' and the pressure side spar cap 54 of the first blade segment 24 while a second engagement interface 80' may be defined between the second beam portion 72' of the joint beam 66 and the suction side spar cap 56 of the first blade segment 24. Similarly, a third engagement interface 79' may be defined between the first beam portion 70' of the joint beam 66' and the pressure side spar cap 60 of the second blade segment 26 while a fourth engagement interface 81' may be defined between the second beam portion 72' of the joint beam 66' and the suction side spar cap 62 of the second blade segment 26.

It should be appreciated that, given the compression of the joint beam 66' between the opposed spar caps 54, 56, 60, 62 of the blade segments 24, 26, the flapwise height of the joint beam 66' may be reduced when the first and second blade segments 24, 26 are assembled together. For instance, as shown in FIG. 9, when the joint beam 66' is installed within the blade segments 24, 26, the beam portions 70', 72' may be compressed towards each other such that the joint beam 66' defines a compressed or pre-loaded flapwise height 84' between the outer surfaces of the first and second beam portions 70',72'. In such an embodiment, the pre-loaded flapwise height 84' of the joint beam 66' may be less than a corresponding non-compressed or unloaded flapwise height (not shown) of the joint beam 66' prior to the beam 66' being installed within the blade segments 24, 26.

Additionally, as shown in FIG. 9, similar to the embodiment described above, one or more wear-resistant components and/or coatings may be provided at each engagement interface 78',79', 80',81' defined between the joint beam 66 and the blade segments 24, 26. For instance, in the illustrated embodiment, wear plates 86' may be provided at each engagement interface 78',79', 80',81' defined between one of the beam portions 70',72' of the joint beam 66' and the adjacent spar caps 54, 56, 60, 62 of the first and second blade segments 24, 26. Alternatively, any other suitable wear-resistant component(s) and/or coating(s) may be provided at each engagement interface 78',79', 80',81' to provide a more durable surface to accommodate the rubbing and/or loading occurring at such interfaces.

It should be appreciated that, although not shown, one or more stiffening members may also be provided within the gap 74' defined between the first and second beam portions 70',72' of the joint beam 66' to provide additional structural integrity to the joint beam 66', particularly during compression of the joint beam 66'. For instance, similar to the embodiment described above, opposed stiffening members may be provided along the inner surfaces of the first and second beam portions 70',72', respectively, at or adjacent to the spanwise location(s) of the engagement interfaces 78', 79', 80',81' defined between the joint beam 66' and the blade segments 24, 26.

Referring still to FIGS. 8 and 9, in several embodiments, the joint beam 66' may be configured to be coupled to each blade segment 24, 26 via a pinned connection provided at or adjacent to its outer beam ends 67', 68'. Specifically, as shown in FIG. 8, a first retaining pin 96' may be configured to be received through the joint beam 66' at or adjacent to its first outer beam end 67' for coupling the joint beam 66' to the first blade segment 24. In such an embodiment, the first retaining pin 96' may be configured to be received within a corresponding structural component(s) of the first blade segment 24, such as a bearing block(s) 98, shear web(s) 58 and/or any other suitable component(s) of the first blade segment 24. Similarly, as shown in FIG. 8, a second retaining pin 97' may be configured to be received through the joint beam 66' at or adjacent to its second outer beam end 68' for coupling the joint beam 66' to the second blade segment 26. In such an embodiment, the second retaining pin 97' may be configured to be received within a corresponding structural component(s) of the second blade segment 26, such as a bearing block(s) 98, shear web(s) 64 and/or any other suitable component(s) of the second blade segment 26.

Referring now to FIGS. 10-13, another embodiment of a rotor blade assembly 122 is illustrated in accordance with aspects of the present subject matter. Specifically, FIG. 10 illustrates a perspective view of the rotor blade assembly 122 and FIG. 11 illustrates a cross-sectional view of the rotor blade assembly 122 shown in FIG. 10 taken about line 11-11. Additionally, FIG. 12 illustrates a cross-sectional view of the portion of the rotor blade assembly 122 shown in FIG. 11 taken about line 12-12 and FIG. 13 illustrates a cross-sectional view of the rotor blade assembly 122 shown in FIG. 11 taken about line 13-13.

In general, the rotor blade assembly 122 may be configured similar to the rotor blade assembly 22 described above with reference to FIGS. 2 and 3. For example, the rotor blade assembly 122 may be formed from two blade segments 124, 126, namely a first blade segment 124 (e.g., a root segment) and a second blade segment 126 (e.g., a tip segment), with the first blade segment 124 extend lengthwise between a blade root 128 and a first joint end 132 and the second blade segment 126 extending lengthwise between a blade tip 130 and a second joint end 134. In such an embodiment, the first and second blade segments 124, 126 may generally be configured to be coupled to one another at their joint ends 132, 134 to define a joint interface 136 defined between the two segments 124, 126 at the location of the blade joint.

It should be appreciated that each blade segment 124, 126 may generally be configured similar to the blade segments 24, 26 described above. For instance, each blade segment 124, 126 may include an outer shell 138, 140 configured to extend between the opposed ends of such segment. In such an embodiment, the outer shells 138, 140 may collectively define a pressure side 142 and a suction side 144 of the rotor blade assembly 122, with the pressure and suction sides 142, 144 extending between leading and trailing edges 146, 148 of the rotor blade assembly 122. Additionally, in several embodiments, each outer shell 138, 140 may also include one or more internal structural components contained therein that is configured to provide increased stiffness, buckling resistance and/or strength to the rotor blade assembly 122. For example, as shown in dashed lines in FIG. 10, the first blade segment 124 may include one or more pairs of longitudinally extending structural components positioned within the first outer shell 138, such as a pair of opposed spar caps 154, 156 (e.g., a first pressure side spar cap 154 (FIGS. 11 and 13) and a first suction side par cap 156 (FIGS. 11 and 13)) and one or more shear webs 158 extending between the opposed spar caps 154, 156. Similarly, as shown in dashed lines in FIG. 10, the second blade segment 126 may include one or more one or more longitudinally extending structural components positioned within the second outer shell 140, such as a pair of opposed spar caps 160, 162 (e.g., a second pressure side spar cap 160 (FIG. 11) and a second suction side par cap 162 (11)) and one or more shear webs 164 extending between the opposed spar caps 160, 162.

Moreover, the rotor blade assembly 122 may also include one or more joint-related components configured to extend across the joint interface 136 defined between the blade segments 124, 126 to facilitate coupling the first blade segment 124 to the second blade segment 126. For instance, as particularly shown in FIGS. 10-13, the second blade segment 126 may include a joint beam 166 extending outwardly from its second joint end 134 that is configured to be received within the interior of the first blade segment 124. In addition, in one embodiment, the rotor blade assembly 122 may include one or more pairs of pre-loaded compression members 177, 178, 179, 180 positioned between the joint beam 166 and one or more pairs of opposed, internal structural components of the first blade segment 124. As will be described in greater detail below, when the joint beam 166 is inserted within the first blade segment 124, the pre-loaded compression members 177, 178, 179, 180 may be compressed between the joint beam 166 and the opposed structural components of the first blade segment 124 (e.g., the opposed spar caps 154, 156 and/or the opposed shear webs 158 of the first blade segment 124). Such compression of the pre-loaded compression members 177, 178, 179, 180 may create an interference-type or compression fit between the joint beam 166 and the first blade segment 124. As a result, loads from the second blade segment 126 may be transferred to the first blade segment 126 due to the forced compression fit provided between the joint beam 166 and the internal components of the first blade segment 124 via the pre-loaded compression members 177, 178, 179, 180.

In general, the joint beam 166 may correspond to a structural-type, hollow beam configured to extend outwardly from the second joint end 134 of the second blade segment 126 to an outer beam end 168. In one embodiment, the joint beam 166 may have a box-like configuration. Specifically, as shown in FIGS. 11 and 13, the joint beam 166 may include both a pressure side wall 170 and an opposed suction side wall 171 extending between the second joint end 134 of the second blade segment 126 and the outer beam end 168. In such an embodiment, when the joint beam 166 is received within the first blade segment 124, the pressure side wall 170 of the joint beam 166 may be configured to extend generally adjacent to the pressure side spar cap 154 of the first blade segment 124 and the suction side wall 171 of the joint beam 166 may be configured to extend generally adjacent to the suction side spar cap 156 of the first blade segment 124. Additionally, as shown in FIGS. 12 and 13, the joint beam 166 may include first and second auxiliary walls 172, 173 extending in the flapwise direction between the pressure and suction side walls 170, 171, with the auxiliary walls 172, 173 being spaced apart from each other in the chordwise direction such that the joint beam 166 generally defines a box-shaped, hollow cross-section. In such an embodiment, when the joint beam 166 is received within the first blade segment 124, the first auxiliary wall 170 of the joint beam 166 may be configured to extend generally adjacent to one of the shear webs 158 of the first blade segment 124 and the second auxiliary wall 172 may be configured to extend generally adjacent to the opposed shear web 158 of the first blade segment 124.

In one embodiment, at least a portion of the joint beam 166 may be formed integrally with the opposed spar caps 160, 162 of the second blade segment 126. For example, as shown in FIG. 11, the pressure side wall 170 of the joint beam 166 may correspond to an extension of the pressure side spar cap 160 of the second blade segment 126 while the suction side wall 171 of the joint beam 166 may correspond to an extension of the suction side spar cap 162 of the second blade segment 126. However, in alternative embodiments, the joint beam 166 may correspond to a separate component configured to be separately coupled to the second blade segment 124.

Additionally, as indicated above, one or more pairs of pre-loaded compression members 177, 178, 179, 180 may be positioned between the joint beam 166 and one or more opposed pairs of internal structural components of the first blade segment 124. Specifically, in several embodiments, a first pair of pre-loaded compression members 177, 178 may be installed between the joint beam 166 and the opposed spar caps 154, 156 of the first blade segment 124. For instance, as shown in FIGS. 11 and 13, when the joint beam 166 is received within the first blade segment 124, a first pre-loaded compression member 177 may be compressed between the pressure side wall 170 of the joint beam 166 and the adjacent pressure side spar cap 154 of the first blade segment 124 while a second pre-loaded compression member 178 may be compressed between the suction side wall 171 of the joint beam 166 and the adjacent suction side spar cap 156 of the first blade segment 124. Similarly, in several embodiments, a second pair of pre-loaded compression members 179, 180 may be installed between the joint beam 166 and the opposed shear webs 158 of the first blade segment 124. For instance, as shown in FIGS. 12 and 13, when the joint beam 166 is received within the first blade segment 124, a third pre-loaded compression member 179 may be compressed between the first auxiliary wall 172 of the joint beam 166 and the adjacent shear web 158 of the first blade segment 124 while a fourth pre-loaded compression member 180 may be compressed between the second auxiliary wall 173 of the joint beam 166 and the other, opposed shear web 158 of the first blade segment 124. As such, chordwise and flapwise loads transmitted through the second blade segment 126 may be transferred to the first blade segment 126 at the contact or engagement interface provided between the joint beam 166 and the first blade segment 124 via the pre-loaded compression members 177, 178, 179, 180.

It should be appreciated that, in general, the pre-loaded compression members 177, 178, 179, 180 may correspond to any suitable compressible, spring-like components that may be configured to function as described herein. For instance, in the illustrated embodiment, the pre-loaded compression members 177, 178, 179, 180 are configured as leaf springs coupled to the inner surfaces of the opposed structural components of the first blade segment 124 such that each leaf spring extends outwardly from its adjacent structural component and contacts or is otherwise compressed against the adjacent wall 170, 171, 172, 173 of the joint beam 166. In such an embodiment, the leaf springs may be formed from any suitable material that provides the desired spring-like qualities for the pre-loaded compression members 177, 178, 179, 180, such as a fiber-reinforced composite material. It should be appreciated that, in other embodiments, the leaf springs may be coupled to the outer surfaces of the walls 170, 171, 172, 173 of the joint beam 166 such that each leaf spring extends outwardly from its adjacent beam wall 170, 171, 172, 173 and contacts or is otherwise compressed against the adjacent structural component of the first blade segment 124.

In another embodiment, the pre-loaded compression members 177, 178, 179, 180 may correspond to any other suitable compressible, spring-like component. For instance, FIG. 14 illustrates a similar cross-sectional view of the rotor blade assembly 122 shown in FIG. 13, particularly illustrating another embodiment of suitable pre-loaded compression members 177', 178', 179', 180' that may be utilized herein in accordance with aspects of the present subject matter. As shown, the pre-loaded compression members 177', 178', 179', 180' are configured as coiled or helically-shaped springs. In such an embodiment, each coiled spring may be compressed between one of the walls 170, 171, 172, 173 of the joint beam 166 and the adjacent internal structural component of the first blade segment 124.

Referring back to FIGS. 10-13, in several embodiments, the joint beam 166 may be configured to be coupled to the first blade segment 124 via a pinned connection. Specifically, as shown in FIG. 12, the rotor blade assembly 122 may include a retaining pin 196 configured to be inserted through a portion of the joint beam 166 disposed between the joint interface 136 and the spanwise location(s) of the pre-loaded compression members 177, 178, 179, 180. In such an embodiment, the retaining pin 196 may be configured to be received through one or more structural members or components of the first blade segment 124, such as one or more of the shear webs 158 and/or one or more associated bearing blocks 198 installed at or adjacent to the shear webs 158. Such a pinned connection may function to prevent outward axial or spanwise movement of the second blade segment 126 relative to the first blade segment 124 during operation of the wind turbine 10. In this regard, the pinned connection may prevent axial liberation of the second blade segment 126 from the first blade segment 124 while the interference or compression fit provided at the contact or engagement interfaces defined between the joint beam 166 and the first blade segment 24 via the pre-loaded compression members 177, 178, 179, 180 may serve to allow loads to be transferred from the second blade segment 126 to the first blade segment 124.

It should be appreciated that, similar to the embodiments described above, one or more wear-resistant components and/or coatings may be provided at each engagement interface defined at the pre-loaded compression members 177, 178, 179, 180. For instance, in one embodiment, wear plates may be provided at the interface defined between each pre-loaded compression member 177, 178, 179, 180 and the joint beam 166.

It should also be appreciated that, although the joint beam 166 is described herein as extending outwardly from the second blade segment 126, the joint beam 166 may, instead, be configured to extend outwardly from the first blade segment 124. In such an embodiment, the joint beam 166 may be configured to be received within the interior of the second blade segment 126 and engage corresponding pre-loaded compression members 177, 178, 179, 180 disposed within the second blade segment 126.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a first blade segment including a first joint end and a first pair of opposed internal structural components, the first pair of opposed internal structural components including a first internal structural component and a second internal structural component;
    a second blade segment including a second joint end, the second blade segment being coupled to the first blade segment such that the first and second joint ends are located at or adjacent to a joint interface defined between the first and second blade segments;
    a pre-loaded beam extending outwardly from the second joint end of the second blade segment in a spanwise direction of the second blade segment across the joint interface such that the pre-loaded beam is received within an interior of the first blade segment, the pre-loaded beam being compressed between the first pair of opposed internal structural components of the first blade segment such that a first engagement interface is defined within the interior of the first blade segment between a first side of the pre-loaded beam and the first internal structural component and a second engagement interface is defined within the interior of the first blade segment between an opposed second side of the pre-loaded beam and the second internal structural component; and
    a retaining pin extending through the pre-loaded beam to couple the pre-loaded beam to the first blade segment at a location spaced apart entirely from the first and second engagement interfaces in the spanwise direction such that a spanwise distance is defined between the retaining pin and a closest portion of each of the first and second engagement interfaces to the retaining pin in the spanwise direction.

2. The rotor blade assembly of claim 1, wherein the first and second internal structural components comprises opposed spar caps of the first blade segment.

3. The rotor blade assembly of claim 1, wherein the pre-loaded beam defines a pre-loaded height between the first and second engagement interfaces, the pre-loaded height being less than a corresponding unloaded height of the pre-loaded beam.

4. The rotor blade assembly of claim 1, wherein the pre-loaded beam is formed integrally with a pair of opposed spar caps of the second blade segment.

5. The rotor blade assembly of claim 1, wherein the pre-loaded beam extends outwardly from the second joint end of the second blade segment to an outer beam end disposed within the interior of the first blade segment.

6. The rotor blade assembly of claim 5, wherein the first side of the pre-loaded beam is defined by a first beam portion extending from the second joint end of the second blade segment to the outer beam end and the second side of the pre-loaded beam is defined by a second beam portion extending from the second joint end of the second blade segment to the outer beam end.

7. The rotor blade assembly of claim 6, wherein the first and second beam portions are spaced apart from each other at a spanwise location of the first and second engagement interfaces such that a gap is defined between the first and second beam portions at the spanwise location.

8. The rotor blade assembly of claim 7, further comprising at least one stiffening member coupled to at least one of the first beam portion or the second beam portion within the gap defined between the first and second beam portions at the spanwise location.

9. The rotor blade assembly of claim 1, wherein the retaining pin is positioned in the spanwise direction between the joint interface and the closest portion of each of the first and second engagement interfaces.

10. The rotor blade assembly of claim 1, wherein the pre-loaded beam further extends from the joint interface into an interior of the second blade segment, wherein the second blade segment includes a second pair of opposed internal structural components, the second pair of opposed internal structural components including a third internal structural component and a fourth internal structural component, the pre-loaded beam being compressed between the second pair of opposed internal structural components of the second blade segment such that a third engagement interface is defined within the interior of the second blade segment between the first side of the pre-loaded beam and the third internal structural component and a fourth engagement interface is defined within the interior of the second blade segment between the opposed second side of the pre-loaded beam and the fourth internal structural component.

11. The rotor blade assembly of claim 10, wherein the pre-loaded beam extends lengthwise between a first outer beam end disposed within the interior of the first blade segment and a second outer beam end disposed within the interior of the second blade segment.

12. The rotor blade assembly of claim 11, wherein the retaining pin comprises a first retaining pin and further comprising a second retaining pin extending through the pre-loaded beam within the interior of the second blade segment to couple the pre-loaded beam to the second blade segment.

13. The rotor blade assembly of claim 11, wherein the first side of the pre-loaded beam is defined by a first beam portion extending between the first and second outer beam ends and the second side of the pre-loaded beam is defined by a second beam portion extending between the first and second outer beam ends, wherein the first and second beam portions are spaced apart from each other at a spanwise location of the joint interface defined between the first and second blade segments.

14. The rotor blade assembly of claim 1, further comprising at least one wear-resistant component or wear-resistant coating disposed at the first and second engagement interfaces defined between the pre-loaded beam and the first blade segment.

15. A rotor blade assembly for a wind turbine, the rotor blade assembly comprising:
a first blade segment including a first joint end and first and second spar caps extending within an interior of the first blade segment, at least one shear web of the first blade segment extending between the first and second spar caps;
a second blade segment including a second joint end, the second blade segment being coupled to the first blade segment such that the first and second joint ends are located at or adjacent to a joint interface defined between the first and second blade segments;
a joint beam extending outwardly from the second joint end of the second blade segment across the joint interface such that the joint beam is received within an interior of the first blade segment at a location disposed between the pair of opposed internal structural components of the first blade segment;
a first pre-loaded compression member compressed between the joint beam and the first spar cap of the first blade segment; and
a second pre-loaded compression member separate from the first pre-loaded compression member and being compressed between the joint beam and the second spar cap of the first blade segment,
wherein the first and second pre-loaded compression members are spaced apart from each other within the first blade segment.

16. The rotor blade assembly of claim 15, wherein the first and second spar caps comprise pressure and suction side spar caps of the first blade segment and wherein the joint beam includes a pressure side wall and an opposed suction side wall, the first pre-loaded compression member being compressed between the pressure side spar cap of the first blade segment and the pressure side wall of the joint beam, the second pre-loaded compression member being compressed between the suction side spar cap of the first blade segment and the suction side wall of the joint beam.

17. The rotor blade assembly of claim 16, wherein the joint beam further includes first and second auxiliary walls extending between the pressure and suction side walls and wherein the at least one shear web of the first blade segment includes first and second shear webs extending between the pressure and suction side spar caps along opposed sides of the joint beam, further comprising a first auxiliary compression member positioned between the first auxiliary wall of the joint beam and the first shear web of the first blade segment and a second auxiliary compression member positioned between the second auxiliary wall of the joint beam and the second shear web.

18. The rotor blade assembly of claim 15, wherein each of the first and second pre-loaded compression members comprises one of a leaf spring or a coil spring.

19. The rotor blade assembly of claim 15, further comprising a retaining pin extending through the joint beam to couple the joint beam to the first blade segment at a location spaced apart entirely from the first and second pre-loaded compression members in a spanwise direction of the rotor blade assembly.

20. A rotor blade assembly for a wind turbine, the rotor blade assembly comprising:
a first blade segment including a first joint end and a pair of opposed internal structural components extending within an interior of the first blade segment;
a second blade segment including a second joint end, the second blade segment being coupled to the first blade segment such that the first and second joint ends are located at or adjacent to a joint interface defined between the first and second blade segments;
a joint beam extending outwardly from the second joint end of the second blade segment across the joint interface such that the joint beam is received within an interior of the first blade segment at a location disposed between the pair of opposed internal structural components of the first blade segment;
a first pre-loaded compression member positioned between the joint beam and a first structural component of the pair of opposed internal structural components of the first blade segment; and
a second pre-loaded compression member positioned between the joint beam and a second structural component of the pair of opposed internal structural components of the first blade segment,
wherein each of the first and second pre-loaded compression members comprises one of a leaf spring or a coil spring.

\* \* \* \* \*